(12) United States Patent
Valsecchi et al.

(10) Patent No.: US 11,562,428 B2
(45) Date of Patent: Jan. 24, 2023

(54) MARKET TRADING SYSTEM IN GRAPHICAL USER INTERFACE THEREFORE

(71) Applicant: S&P Global Inc., New York, NY (US)

(72) Inventors: Viviana Valsecchi, London (GB); Jiri Bukartyk, New York, NY (US); Srinivas Renduchintala, New York, NY (US); Nikhil Bhanushali, New York, NY (US); David Asbury, London (GB); Muralikrishna Manchikatla, Hyderabad (IN); Hemant Athavale, New York, NY (US); Dipti Gawankar, New York, NY (US); Priyanka John, New York, NY (US); Rebecca Thorne, London (GB); Calvin Beloy, New York, NY (US)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 17/182,830

(22) Filed: Feb. 23, 2021

(65) Prior Publication Data
US 2022/0270169 A1 Aug. 25, 2022

(51) Int. Cl.
*G06Q 40/04* (2012.01)
*G06F 3/0484* (2022.01)
*G06F 3/0482* (2013.01)
*G06Q 10/10* (2012.01)

(52) U.S. Cl.
CPC .......... *G06Q 40/04* (2013.01); *G06F 3/0482* (2013.01); *G06F 3/0484* (2013.01); *G06Q 10/10* (2013.01)

(58) Field of Classification Search
CPC ...... G06Q 40/04; G06Q 10/10; G06F 3/0482; G06F 3/0484
See application file for complete search history.

(56) References Cited

U.S. PATENT DOCUMENTS

| 7,016,872 B1 * | 3/2006 | Bettis | G06Q 40/04 705/36 R |
| 8,392,314 B1 * | 3/2013 | Epstein | G06Q 40/04 705/37 |
| 11,074,649 B2 * | 7/2021 | Jaycobs | G06F 3/04883 |

(Continued)

OTHER PUBLICATIONS

Platts Assessments Methodology Guide, Apr. 2020, 14 pages, S&P Platts, a division of S&P Global Inc., www.spglobal.com.

*Primary Examiner* — Daeho D Song
(74) *Attorney, Agent, or Firm* — Yee & Associates, P.C.

(57) ABSTRACT

A computer implemented method, computer system, and computer program product display market transactions in a graphical user interface. A market transaction system identifies a selected market and a market session displayed in a first region of the graphical user interface. In the first region of the graphical user interface, the market transaction system displays transactions for market participants in the selected market over the market session. The transactions submitted by each market participant are separately displayed from those of other market participants. In a second region of the graphical user interface, the market transaction system may display a number of reports that are relevant to the selected market. The market transaction system subscribes a user to a report in response to receiving the user's selection of the report from the second region of the graphical user interface.

24 Claims, 11 Drawing Sheets

(56) References Cited

U.S. PATENT DOCUMENTS

| | | | |
|---|---|---|---|
| 11,139,955 B1* | 10/2021 | So | G06Q 20/3674 |
| 2002/0194115 A1* | 12/2002 | Nordlicht | G06Q 40/04 |
| | | | 705/37 |
| 2003/0055776 A1* | 3/2003 | Samuelson | H02J 3/008 |
| | | | 705/37 |
| 2004/0267655 A1* | 12/2004 | Davidowitz | G06Q 40/00 |
| | | | 705/37 |
| 2005/0137964 A1* | 6/2005 | Nordlicht | G06Q 40/06 |
| | | | 705/37 |
| 2006/0059072 A1* | 3/2006 | Boglaev | G06Q 40/00 |
| | | | 705/35 |
| 2006/0195375 A1* | 8/2006 | Bohn | G06Q 40/06 |
| | | | 705/35 |
| 2009/0292547 A1* | 11/2009 | Lenti | G06Q 40/04 |
| | | | 705/14.71 |
| 2010/0287087 A1* | 11/2010 | Bartko | G06Q 40/04 |
| | | | 705/37 |
| 2011/0251940 A1* | 10/2011 | Heaton | G06Q 40/04 |
| | | | 715/810 |
| 2012/0150716 A1* | 6/2012 | Bark | G06Q 40/06 |
| | | | 705/37 |
| 2014/0245171 A1* | 8/2014 | Jaycobs | G06F 3/04883 |
| | | | 715/746 |
| 2017/0053351 A1* | 2/2017 | Lutnick | G06Q 40/04 |
| 2017/0308954 A1* | 10/2017 | McLaren | G06T 11/206 |
| 2017/0372421 A1* | 12/2017 | Melton | G06Q 40/04 |
| 2018/0350000 A1* | 12/2018 | Asllan | G06Q 40/04 |
| 2019/0034558 A1* | 1/2019 | Leeman-Munk | G06F 16/904 |
| 2020/0005341 A1* | 1/2020 | Marsh | G06Q 30/0202 |
| 2020/0218406 A1* | 7/2020 | Leyden | G06T 11/206 |
| 2020/0258153 A1* | 8/2020 | Tilfors | H04L 9/0643 |
| 2021/0042835 A1* | 2/2021 | Simpson | G06Q 20/0855 |
| 2022/0253950 A1* | 8/2022 | Das | G06N 3/049 |

\* cited by examiner

Reports

∨ FILTERS   Period: One Week   Report Name: All

THIRD PAGE 500

BELL ICON 510

| REPORT NAME | GEOGRAPHY | COMMODITY | DATE | DOWNLOAD | CREATE ALERT |
|---|---|---|---|---|---|
| ⋮ Oilgram Price Report | USA | Petroleum | 10/13/2020 | PDF ⤓ | 🔔 |
| ⋮ Crude Oil Marketwire | USA | Petroleum | 10/12/2020 | PDF ⤓ | 🔔 |
| ⋮ Oilgram Price Report | USA | Petroleum | 10/12/2020 | PDF ⤓ | 🔔 |
| ⋮ Crude Oil Marketwire | USA | Petroleum | 10/9/2020 | PDF ⤓ | 🔔 |
| ⋮ Oilgram Price Report | USA | Petroleum | 10/9/2020 | PDF ⤓ | 🔔 |
| ⋮ Crude Oil Marketwire | USA | Petroleum | 10/8/2020 | PDF ⤓ | 🔔 |
| ⋮ Oilgram Price Report | USA | Petroleum | 10/8/2020 | PDF ⤓ | 🔔 |

Show [10 ∨] records   1 - 7 of 7 records   [⫷] [PREV] [1] [NEXT]

FIG. 5

MARKET TRADING SYSTEM IN GRAPHICAL USER INTERFACE THEREFORE

BACKGROUND INFORMATION

1. Field

The disclosure relates generally to an improved computer system and more specifically to a method, apparatus, computer system, and program products. More particularly, the disclosure relates to computer systems and graphical user interfaces for visibly displaying market data and trends.

2. Description of the Related Art

An exchange is a central marketplace with established rules and regulations where buyers and sellers can meet to trade commodities. Many of these exchanges throughout the world utilize electronic trading in varying degrees to trade stocks, bonds, futures, options and other tradable objects. Market participants can link to the electronic trading system using a trading client in communication with an electronic exchange. A trading client, typically installed on a remote computer, allow traders to participate in the market. The electronic exchange sends information about a market, such as prices and quantities, to the trading client. Using the trading client, a market participant can submit orders to the electronic exchange. The electronic exchange then attempts to consummate a trade by matching the orders submitted by the various market participants.

The orders, including bids and offers, make up the market data. The exchange typically provides this market data to all market participants. For example, with each submitted order, traders must supply information like the name of the commodity, quantity, restrictions, price and multiple other variables. Without this information, the market will not accept the order.

Quote streaming services are increasingly offered as an add-on with many trading clients. Real-time quotes let market participants know the exact price for a stock they are trading at a moment-to-moment rate. In this way, they may have a better idea of the price they will pay when having their order filled. Typically, quote streaming services provide market information in a ticker tape format, where published orders are recorded sequentially in a spreadsheet.

Therefore, it would be desirable to have a method and apparatus that take into account at least some of the issues discussed above, as well as other possible issues. For example, it would be desirable to provide a trading client that allows for easier visualization of trending market data.

SUMMARY

According to one embodiment of the present invention, a computer implemented method is provided for displaying market transactions on a graphical user interface. A computer system identifies selected market from a list of subscribed markets displayed in a first region of the graphical user interface. The computer system identifies a market session for the selected market. The computer system dynamically displaying transactions in the first region of the graphical user interface. The transactions are for market participants in the selected market over the market session. The transactions submitted by a first market participant are separately displayed from the transactions submitted by other market participants as distinct lines of best offers and bids by the first market participant as a function of time within the market session. The computer system displays a number of reports that are relevant to the selected market in a second region of the graphical user interface. The computer system subscribes to a particular report in response to receiving a selection of the particular report from the second region of the graphical user interface.

According to another embodiment of the present invention, a computer system is provided, that includes a hardware processor, a display system having a graphical user interface displayed thereon, and a market transaction system, in communication with the hardware processor and the display system. The market transaction system identifies selected market from a list of subscribed markets displayed in a first region of the graphical user interface. The market transaction system identifies a market session for the selected market. The market transaction system dynamically displaying transactions in the first region of the graphical user interface. The transactions are for market participants in the selected market over the market session. The transactions submitted by a first market participant are separately displayed from the transactions submitted by other market participants as distinct lines of best offers and bids by the first market participant as a function of time within the market session. The market transaction system displays a number of reports that are relevant to the selected market in a second region of the graphical user interface. The market transaction system subscribes to a particular report in response to receiving a selection of the particular report from the second region of the graphical user interface.

According to yet another embodiment of the present invention, a computer program product for displaying market transactions comprises a computer-readable-storage media with program code stored on the computer-readable storage media. The program code includes program code for identifying a selected market from a list of subscribed markets displayed in a first region of the graphical user interface. The program code includes second program code for identifying a market session for the selected market. The program code includes program code for dynamically displaying transactions in the first region of the graphical user interface. The transactions are for market participants in the selected market over the market session. The transactions submitted by a first market participant are separately displayed from the transactions submitted by other market participants as distinct lines of best offers and bids by the first market participant as a function of time within the market session. The program code includes program code for displaying a number of reports that are relevant to the selected market in a second region of the graphical user interface. The program code includes program code for subscribing to a particular report in response to receiving a selection of the particular report from the second region of the graphical user interface.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is a third page of a graphical user interface for displaying market transactions in accordance with an illustrative embodiment;

DETAILED DESCRIPTION

Figure 1:
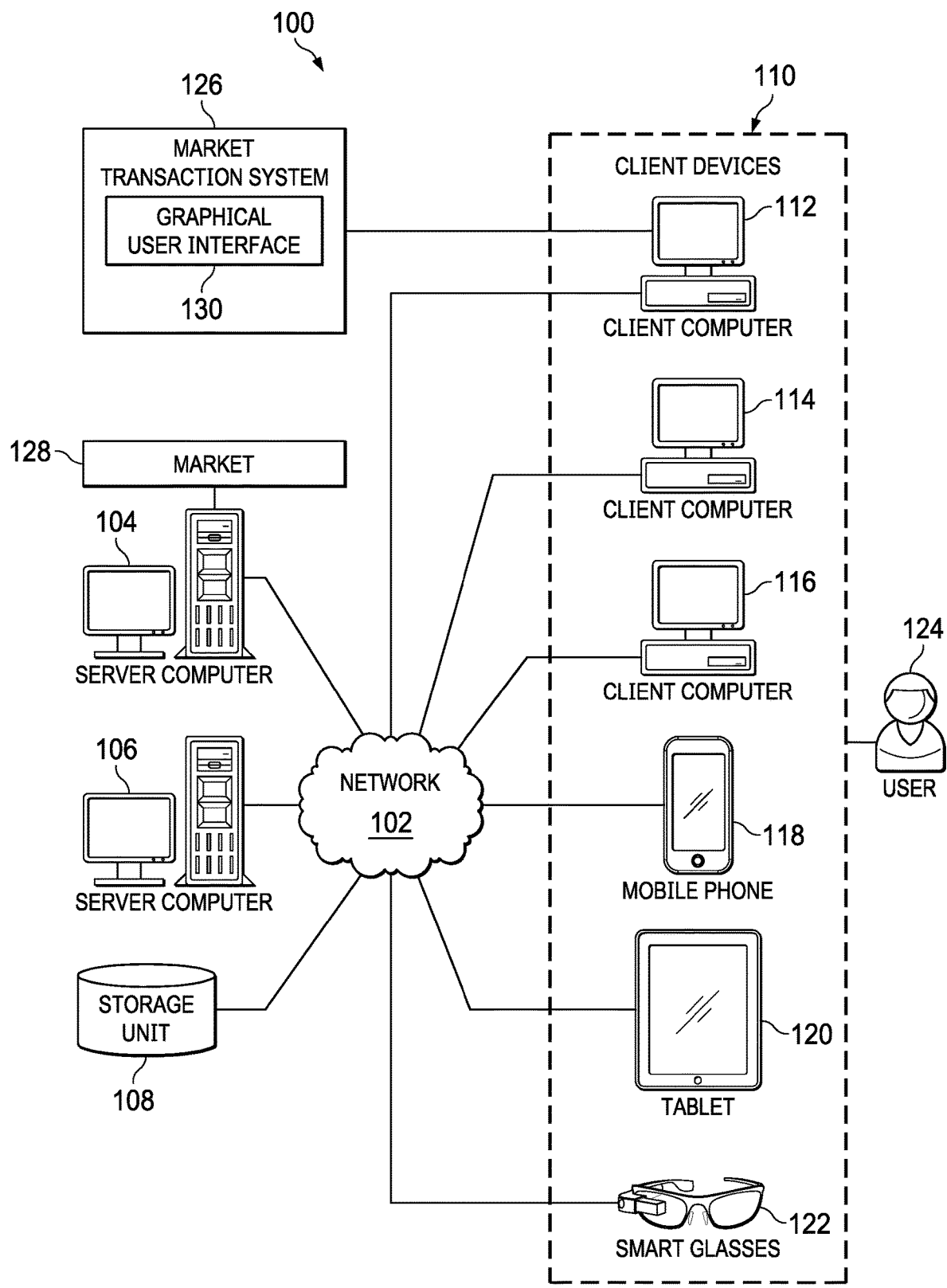
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 can interact with market transaction system 126 running on one or more of client devices 110 to access market 128. Market transaction system 126 is an application for dynamically displaying market transactions submitted to a number of electronic markets, such as market 128.

Market transaction system 126 includes graphical user interface 130. Market transaction system 126 identifies a selected market from a list of subscribed markets displayed in a first region of the graphical user interface 130. Market transaction system 126 identifies a market session for the selected market. Market transaction system 126 dynamically displays transactions in the first region of graphical user interface 130. The transactions are for market participants in the selected market over the market session. The transactions submitted by a first market participant are separately displayed in the first region of graphical user interface 130 from the transactions submitted by other market participants. Graphical user interface 130 separately displays the transactions submitted by each market participant as a distinct line of best offers and bids as a function of time within the market session.

Market transaction system 126 displays a number of reports that are relevant to the selected market in a second region of the graphical user interface. User 124 can subscribe to a particular report by selecting the particular report from the second region of the graphical user interface.

The embodiments described herein solve problems of prior graphical user interface devices (GUIs), in the context of computerized trading, relating to speed, accuracy, and usability. Rather than reciting a mathematical algorithm, a fundamental economic or longstanding commercial practice, or a challenge in business, the embodiments described herein are directed to improvements in existing graphical user interface devices that have no pre-electronic trading analog. The described embodiments solve problems of prior graphical user interface devices in the context of computerized trading relating to usability and visibility. The embodiments provide significantly more than prior graphical user interface devices that merely allow for setting, displaying, and selecting data or information that is visible on a graphical user interface device. Instead, the embodiments described herein require a specific, structured graphical user interface paired with a prescribed functionality directly related to the graphical user interface's structure that is addressed to and resolves a specifically identified problem of recognizing real-time trends in market orders.

Furthermore, the specific structure and concordant functionality of the graphical user interface distinguishes this system as compared to conventional computer implementations of known procedures. The proposed new application or computer-implemented function is not simply the generalized use of a computer as a tool to conduct a known or obvious process. Rather than the routine or conventional use of computers or the Internet, the embodiments described herein provide an inventive concept that allows traders to more efficiently and accurately visualize real-time trends in market orders as well as place trades using this electronic trading system. When considered as a whole, the embodiments described herein overcome a problem that is necessarily rooted in computer technology and that specifically arises in the realm of computer networks, resulting in an improvement to system capabilities.

Figure 2:
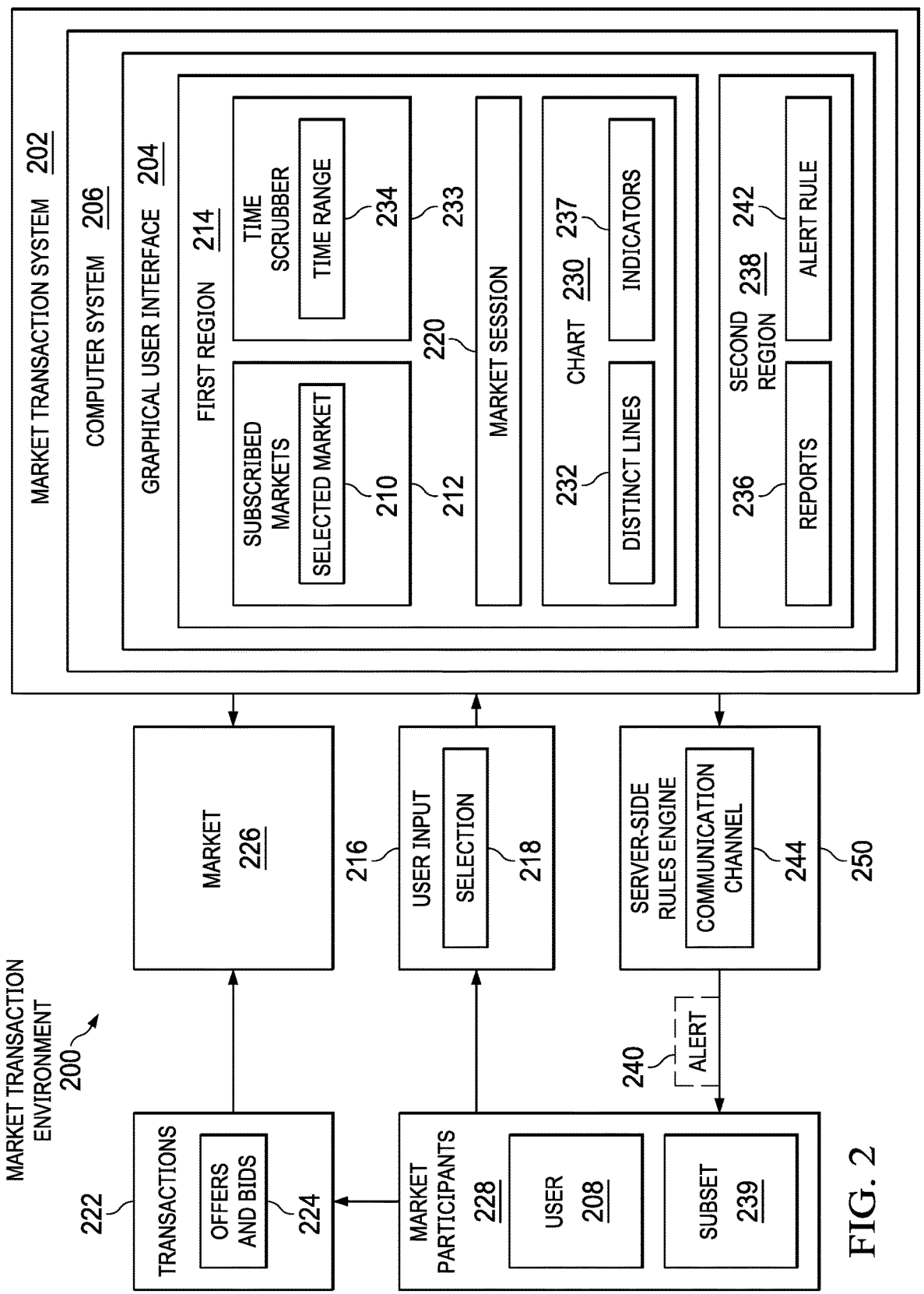
FIG. 2 is a block diagram of an electronic trading environment in accordance with an illustrative embodiment.

With reference now to FIG. 2, a block diagram of a market transaction environment is depicted in accordance with an illustrative embodiment. In this illustrative example, market transaction environment 200 includes components that can be implemented in hardware such as the hardware shown in network data processing system 100 in FIG. 1.

Market transaction environment 200 is an environment in which market transaction system 202 provides services for digitally displaying market transactions and reports for different subscribed markets over a selected market session. As depicted, market transaction environment 200 includes market transaction system 202. Market transaction system 202 is an example of market transaction system 126 of FIG. 1.

In market transaction environment 200, a method for displaying market transactions on a graphical user interface can be performed using graphical user interface 204. In this illustrative example, this method for displaying market transactions on graphical user interface 204. Graphical user interface 204 displays trade data in real-time or in near real-time. In contrast to the scrolling lines of text displayed in prior interfaces, graphical user interface 204 allows user to visualize of bids, offers, and trades transactions into an immediate, easy to understand chart showing the price convergence within a market session. Graphical user interface 204 also represents each strip traded on the MOC market session.

Graphical user interface 204 solves problems of prior graphical user interface devices (GUIs), in the context of computerized trading, relating to speed, accuracy and usability. Rather than reciting a mathematical algorithm, a fundamental economic or longstanding commercial practice, or a challenge in business, graphical user interface 204 is directed to improvements in existing graphical user interface devices that have no pre-electronic trading analog. Graphical user interface 204 utilizes a structured graphical user interface paired with a prescribed functionality directly related to the graphical user interface's structure that is addressed to and resolves a specifically identified problem in the prior state of the art. In this manner, graphical user interface 204 provides more than setting, displaying, and selecting data or visible information in a manner, amounting to significantly more than prior graphical user interface devices.

Furthermore, the specific structure and concordant functionality of graphical user interface 204 distinguishes market transaction system 202 as compared to conventional computer implementations of known procedures. Graphical user interface 204 is not simply the generalized use of a computer as a tool to conduct a known or obvious process. In contrast to the routine or conventional use of computers or the Internet, graphical user interface 204 provide an inventive concept that allows traders to visualize market trends more quickly, as well as efficiently and accurately place trades using this electronic trading system. Therefore, graphical user interface 204 overcomes a problem specifically arising in the realm of computer networks and necessarily rooted in computer technology, resulting in an improvement to system capabilities.

Market transaction system 202 can be implemented in software, hardware, firmware or a combination thereof. When software is used, the operations performed by market transaction system 202 can be implemented in program code configured to run on hardware, such as a processor unit. When firmware is used, the operations performed by market transaction system 202 can be implemented in program code and data and stored in persistent memory to run on a processor unit. When hardware is employed, the hardware may include circuits that operate to perform the operations in market transaction system 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

One or more components of market transaction system 202 can be implemented in computer system 206. Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system. When a number of processors execute instructions for a process, the number of processors can be on the same computer or on different computers in computer system 206. In other words, the process can be distributed between processors on the same or different computers in computer system 206.

As depicted, user 208 can interact with graphical user interface 204 of market transaction system 202 to graphically display market transactions and subscribe to various market reports for different electronic markets. Graphical user interface 204 displays market transactions in a manner that enables user 208 to visualize trends more easily in market data.

In one illustrative example, market transaction system 202 identifies selected market 210 from a list of subscribed markets 212 displayed in first region 214 of graphical user interface 204. Additionally, market transaction system 202 identifies market session 220 for selected market 210.

Market transaction system 202 can identify selected market 210 and market session 220 in a number of different ways that market transaction system 202 can identify selected market 210 and market session 220 by receiving user input 216 from user 208 that includes selection 218 of one or more of selected market 210 and market session 220. For example, graphical user interface 204 can display subscribed markets 212 as graphical control element within graphical user interface 204, such as a drop-down menu. In this example, selection 218 identifies selected market 210 from subscribed markets 212.

Market transaction system 202 dynamically displays transactions 222 in the first region 214 of the graphical user interface 204. Transactions 222, including offers and bids 224, make up the market data. Market 226 typically provides this market data to all market participants 228. For example, with each of transactions 222 submitted to market 226, market participants 228 must supply information like the name of the commodity, quantity, restrictions, price and multiple other variables. Without this information, market 226 may not accept the transaction.

Market participants 228 are buyers and sellers of physical commodities and financial instruments tied to the value of those commodities. Market participants 228 can be major international and national companies, independent trading houses, and financial institutions, as well as end-users of the physical commodities, or entities acting on their behalf.

Graphical user interface 204 displays transactions 222 for market participants 228 in selected market 210 over market session 220. Throughout the day, market transaction system 202 is in constant contact with market participants 228. As soon as transactions 222 are received, market transaction system 202 publishes the market data to all market participants, facilitating price discovery by making all market participants 228 visible to one another and all transactions 222 transparent.

In one illustrative example, transactions 222 are timestamped, and can be displayed in chart 230 as a function of time.

Market participants 228 offer to sell tradable objects at a given price (the ask price) and bid to purchase securities at a given price (the bid price). A bid-ask spread is the amount by which the ask price exceeds the bid price for the tradable object—essentially the difference between the highest price that a buyer is willing to pay for the tradable object and the lowest price that a seller is willing to accept. When a trade is consummated, market participants 228 accept one of these two prices, depending on whether they wish to buy (ask price) or sell (bid price).

As the delivery date of an underlying cash commodity approaches, the price of a futures contract converges toward the spot price of the commodity, such that the price of the futures and the price of the underlying commodity are nearly equal on the last day for delivery to fulfill the terms of the contract. Chart 230 presents a tab for each strip traded over market session 220. Chart 230 visually represents the price convergence of offers and bids 224 for past and active market sessions.

Chart 230 displays transactions 222 submitted by a first one of market participants 228 separately displayed from transactions 222 submitted by other market participants 228. Transactions 222 submitted by each of market participants are separately displayed as distinct lines 232 of best offers and bids 224 by the first market participant as a function of time within the market session. Each line represents the best bid/offer published by a corresponding market participant.

Because graphical user interface 204 separately displays transactions 222 submitted by each of market participants 228, user 208 can quickly visualize price-trends in market 226, including how transactions 222 by the different ones of market participants 228 in selected market 210 may affect the value of other related markets.

The methodology employed by market transaction system 202 operates on the principle that price is a function of time. Bids, offers, and transactions are submitted by participants to market transaction system 202 and published in real time throughout the day until the market closes. Providing a well-defined timestamp is important for understanding the relationships between the related markets. Market transaction system 202 considers the timestamp of record of a market participants intent to buy/sell as the time that market transaction system 202 receives the information, as opposed to the time a message was sent between the market participants. By ensuring that all assessments across different markets reflect market value at the same moment in time, spreads that exist between commodities are also able to be fully and properly visualized.

User 208 can alternate among multiple subscribed markets 212 to see different market data and its visual rendition within chart 230. Comparing the value of related markets is possible when the values of the different markets have been determined at the same moment in time.

For example, comparing the value of a raw material to a processed commodity is possible when both values have been determined at the same moment in time. By contrast, comparing the price of raw material in the morning, to processed material in the afternoon, might deeply impair the relationship between the commodities—particularly when the respective market prices move independently during the intervening period. By providing clear timestamps for assessments, market transaction system 202 is designed to provide assessments that properly reflect outright and spread value during times of high volatility equally well as in times of modest volatility.

In one illustrative example, graphical user interface 204 displays time scrubber 233 for market session 220 in first region 214 of the graphical user interface 204. Time scrubber 233 displays a specific time range 234 for market session 220. Time scrubber 233 enables user 208 to select a specific time range 234 displayed. In response to the selection, first region 214 of graphical user interface 204 is updated to display subset 239 of market participants 228 that are active within the market 226 during the specific time range 234.

In one illustrative example, graphical user interface 204 enables user 208 to visualize transactions 222 submitted by an individual one of market participants 228 by selecting one of distinct lines 232 displayed in chart 230. In this illustrative example, market transaction system 202 receives selection 218 of a first one of distinct lines 232 of transactions 222 for the first one of market participants 228, selected from first region 214 of graphical user interface 204. In response to the selection, market transaction system 202 dynamically obscures the other ones of market participants 228 from first region 214.

In one illustrative example, graphical user interface 204 displays indicators 237 for different transactions. For example, graphical user interface 204 may display a first indicator associated with one of distinct lines 232, indicating that the corresponding one of market participants 228 has consummated a trade. Graphical user interface 204 may display a second indicator associated with one of distinct lines 232 indicating that the corresponding one of market participants 228 has withdrawn from market session 220.

In one illustrative example, graphical user interface 204 may display a spread between selected ones of distinct lines 232, rather than a best offers and bids from market participants 228 collectively. For example, when market transaction system 202 receives a selection of a first one of distinct lines 232 and a selection of a second one of distinct lines 232, market transaction system 202 can dynamically determine a spread between the selected lines at a selected time within the market session 220.

In one illustrative example, market transaction system 202 enables user 208 to submit transactions 222 to market 226 based on the spread between different ones of distinct lines 232. For example, user 208 can enter user input 216 within first region 214 of graphical user interface 204 instructing market transaction system 202 to submit transactions 222 to market 226 based on the spread between the selected ones of distinct lines 232.

Market transaction system 202 displays a number of reports 236 that are relevant to the selected market 210 in a second region 238 of graphical user interface 204. User 208 can subscribe to a particular report by selecting one or more of reports 236 from second region 238 of graphical user interface 204.

In one illustrative example, market transaction system 202 allows user 208 to set and receive alerts 240 based on the availability of reports 236. For example, within second region 238 of graphical user interface 204, user 208 may set alert rule 242. Alert rule 242 may include a communication channel 244 for communicating alert 240 when one of reports 236, or an update for one of reports 236, becomes available. Market transaction system 202 may thereafter register alert rule 242, for example, with a server-side rules engine 250, so that alert 240 is communicated to user 208 over selected channel 246 and independent from market transaction system 202.

In one illustrative example, one or more technical solutions are present that overcome a technical problem with the display of bids, offers and trades transactions in known graphical user interfaces. As a result, one or more technical solutions may provide a technical effect in the context of computerized trading, relating to speed, accuracy, and usability. Graphical user interface 204 displays trade data in real-time or near real-time. In contrast to the scrolling lines of text displayed in prior interfaces, graphical user interface 204 allows user to visualize bids, offers, and trades transactions into an immediate, easy-to-understand chart showing the price convergence within the MOC period.

Computer system 206 can be configured to perform at least one of the steps, operations, or actions described in the different illustrative examples using software, hardware, firmware or a combination thereof. As a result, computer system 206 operates as a special purpose computer system in which graphical user interface 204 in computer system 206 enables a user to visualize of bids, offers, and trades transactions into an immediate, easy to understand chart 230 showing the price convergence within the market session 220. In particular, graphical user interface 204 transforms computer system 206 into a special purpose computer system as compared to currently available general computer systems that do not have graphical user interface 204.

In the illustrative example, the use of graphical user interface 204 in computer system 206 integrates processes into a practical application for displaying market transactions that increases the performance of computer system 206. Rather than reciting a mathematical algorithm, a fundamental economic or longstanding commercial practice, or a challenge in business, the embodiments described herein are directed to improvements in existing graphical user interface devices that have no pre-electronic trading analog. Graphical user interface 204 solves problems of prior graphical user interface devices in the context of computerized trading relating to usability and visibility. Graphical user interface 204 provides significantly more than prior graphical user interface devices that merely allow for setting, displaying, and selecting data or information that is visible on a graphical user interface device. Instead, Graphical user interface 204 utilizes a specific, structured graphical user interface paired with a prescribed functionality directly related to the structure of the interface that is addressed to and resolves a specifically identified problem of recognizing real-time trends in market orders.

Furthermore, the specific structure and concordant functionality of graphical user interface 204 distinguishes this system as compared to conventional computer implementations of known procedures. The proposed new application or computer-implemented function is not simply the generalized use of a computer as a tool to conduct a known or obvious process. Rather than the routine or conventional use of computers or the Internet, graphical user interface 204 provides an inventive concept that allows traders to visualize real-time trends more efficiently and accurately in market transactions, as well as initiating transactions and subscribing to market reports using market transaction system 202. Therefore, when considered as a whole, graphical user interface 204 overcomes a problem that is necessarily rooted in computer technology and specifically arising in the realm of computer networks, resulting in an improvement to system capabilities.

The illustration of market transaction system 202 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
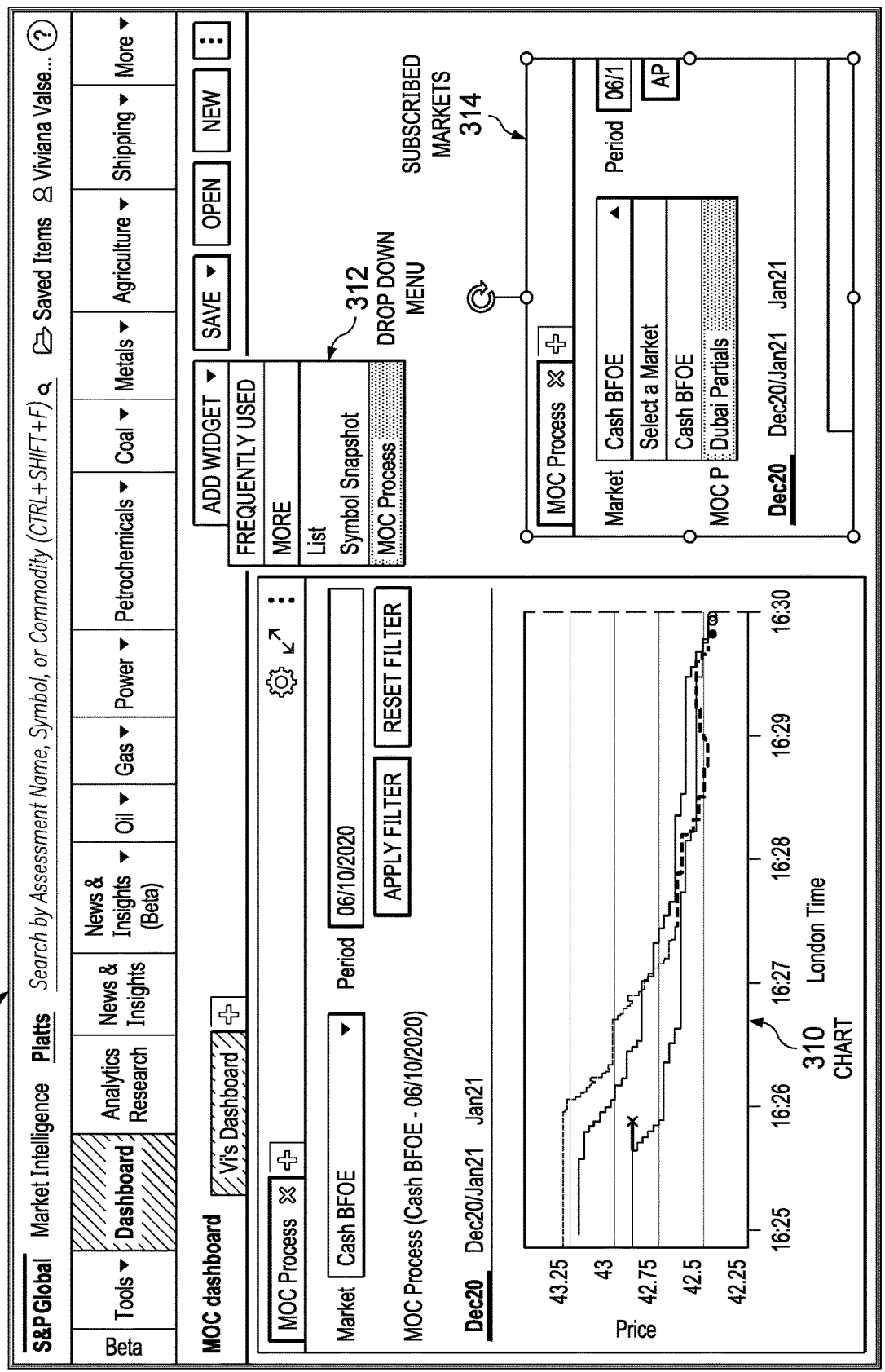
FIG. 3 is a first page of a graphical user interface for displaying market transactions in accordance with an illustrative embodiment.

Turning now to FIG. 3, a first page of a graphical user interface for displaying market transactions in accordance with an illustrative embodiment. Graphical user interface 300 is an example of graphical user interface 204 shown in block form in FIG. 2.

As depicted, graphical user interface 300 is a dashboard, wherein different widgets can be added, removed, or rearranged depending on user preferences. Chart 310 can be added to the dashboard by selecting the corresponding widget from drop-down menu 312. Chart 310 is an example of chart 230 of FIG. 2.

Chart 310 visually represents price convergence for past and active market sessions. Chart 310 presents a Tab for each strip traded on that MOC market session. users can alternate among multiple subscribed markets 314 to see different market data visual rendition for a subscribe market.

Figure 4:
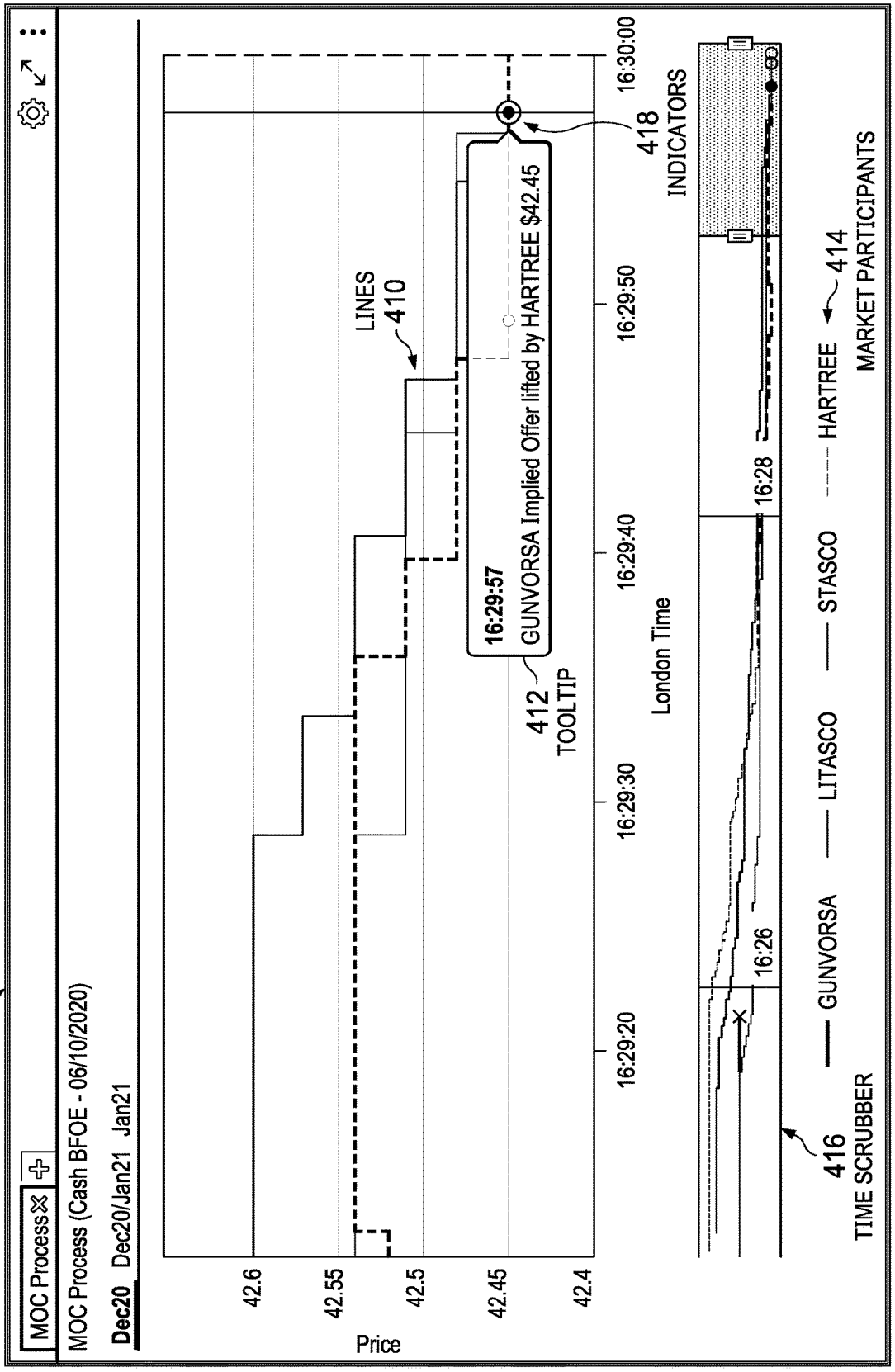
FIG. 4 is a second page of a graphical user interface for displaying market transactions in accordance with an illustrative embodiment.

Referring now to FIG. 4, a second page of a graphical user interface for displaying market transactions in accordance with an illustrative embodiment. Second page 400 is an enlarged view of chart 310 of FIG. 3.

Each of lines 410 represent the best bid/offer published by a market participant. Dotted lines indicate Implied bids/offers. Hovering over lines 410 displays a tooltip 412 that shows market participant names, price and transaction type. Clicking on one of lines 410, or on one of market participants 414 allows a user to highlight a single line one of lines 410.

Time scrubber 416 at the bottom of second page 400 allows a user to zoom into a specific market session time range in chart 310. Time scrubber 416 is an example of time scrubber 233 of FIG. 2. Indicators 418 highlight a trade is consummated and crosses highlight the market participant has withdrawn from the session. Indicators are 418 are an example of indicators 237 of FIG. 2.

FIG. 5 is a third page of a graphical user interface for displaying market transactions in accordance with an illustrative embodiment. By interacting with third page 500, users can set alerts based on market data parameters. Bell icon 510 enables a user to setup notification when a market report has become available.

Figure 6:
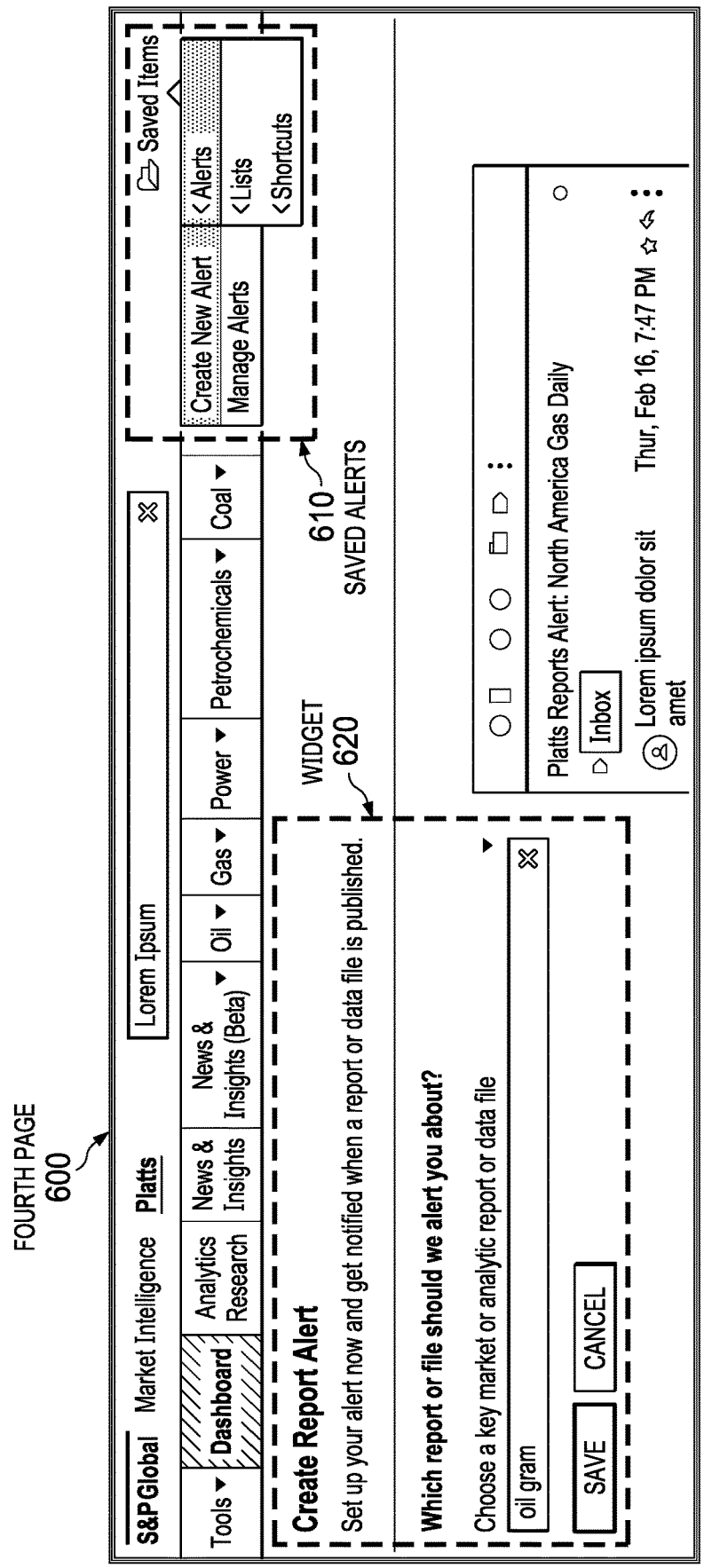
FIG. 6 is a fourth page of a graphical user interface for displaying market transactions in accordance with an illustrative embodiment.

FIG. 6 is a fourth page of a graphical user interface for displaying market transactions in accordance with an illustrative embodiment. Saved alerts 610 allow the user to quickly locate a particular report via the search options. New alert rules can be created and managed by interacting with widget 620.

Figure 7:
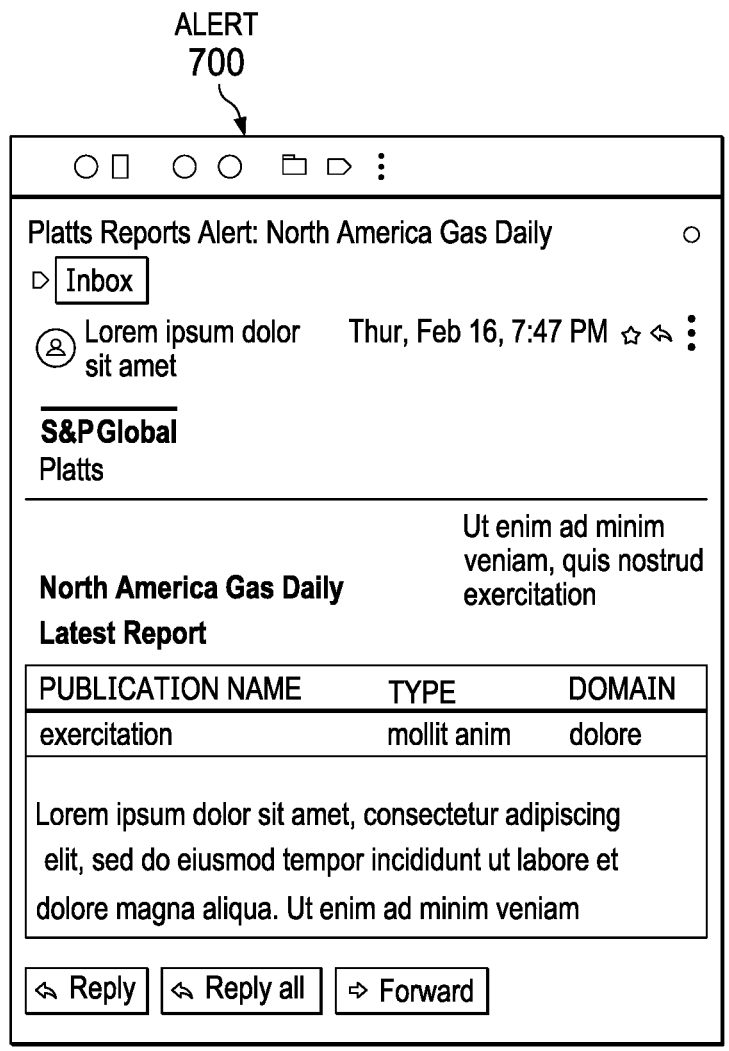
FIG. 7 is a fifth page of a graphical user interface for displaying market transactions in accordance with an illustrative embodiment.

FIG. 7 is an alert for a particular market report in accordance with an illustrative embodiment. Alert 700 is an example of alert 240 of FIG. 2.

In this illustrative example, alert 700 is an email. However, alert 700 can be a message received over other communication channels, such as but not limited to, Short Message Service, Rich Message Service, telephone, squawk box, Instant Messengers, and other proprietary messaging systems.

Figure 8:
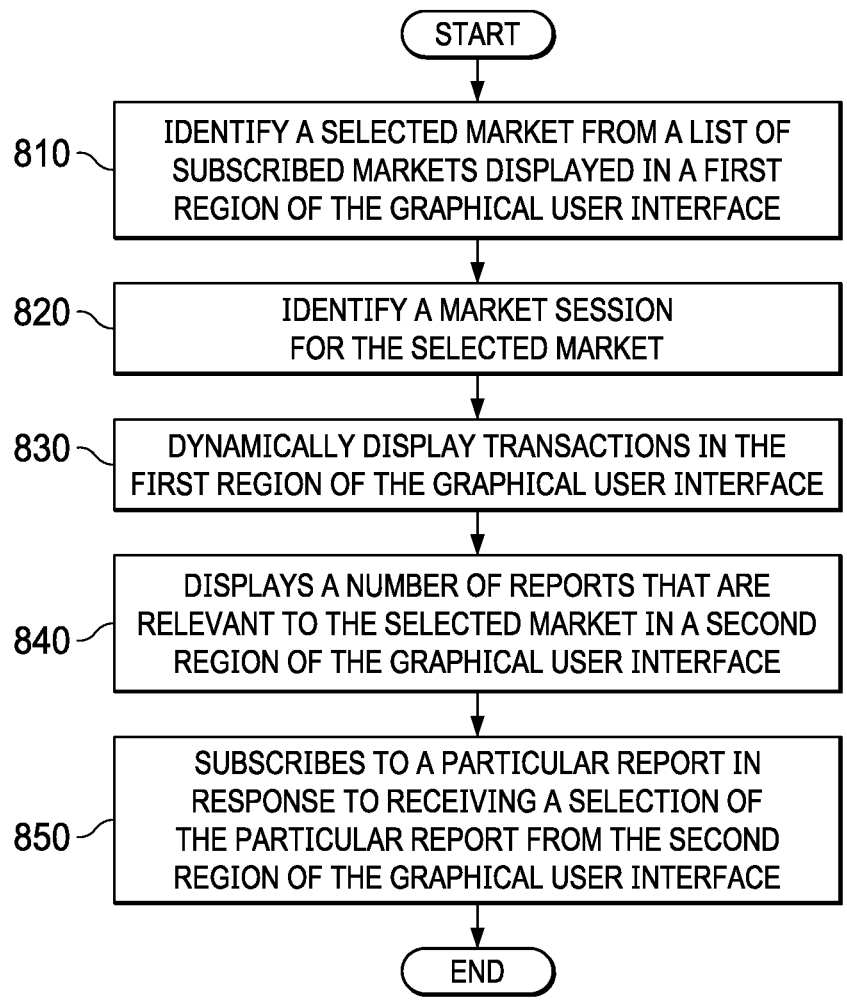
FIG. 8 is a flowchart illustrating a process for displaying market transactions in accordance with an illustrative embodiment.

FIG. 8 is a flowchart illustrating a process for displaying market transactions in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in market transaction system 202 in computer system 206 in FIG. 2.

The process begins by identifying a selected market from a list of subscribed markets displayed in a first region of the graphical user interface (step 810), and identifying a market session for the selected market (step 820).

The process dynamically displays transactions in the first region of the graphical user interface (step 830). The transactions are for market participants in the selected market over the market session. The transactions submitted by a first market participant are separately displayed from the transactions submitted by other market participants as distinct lines of best offers and bids by the first market participant as a function of time within the market session.

The process displays a number of reports that are relevant to the selected market in a second region of the graphical user interface (step 840). The process subscribes to a particular report in response to receiving a selection of the particular report from the second region of the graphical user interface (step 850), and terminates thereafter.

Figure 9:
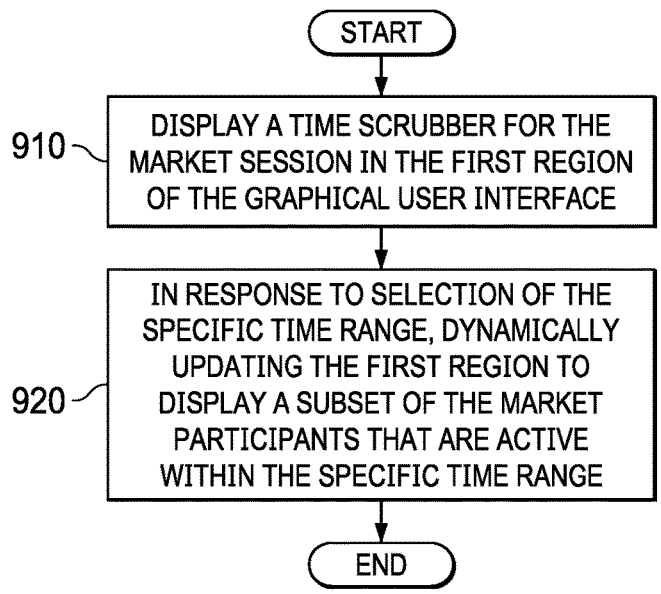
FIG. 9 is a flowchart illustrating a process for displaying market transactions within a specific time range in accordance with an illustrative embodiment.

FIG. 9 is a flowchart illustrating a process for displaying market transactions within a specific time range in accordance with an illustrative embodiment. The process of FIG. 9 can be implemented in conjunction with the graphical user interface displayed in the process of FIG. 8.

The process displays a time scrubber for the market session in the first region of the graphical user interface (step 900). The process receives a selection of a specific time range displayed on the dynamic time scrubber (step 910). In response to the selection of the specific time range, the process dynamically updates the first region to display a subset of the market participants that are active within the specific time range (step 920), and terminates thereafter.

Figure 10:
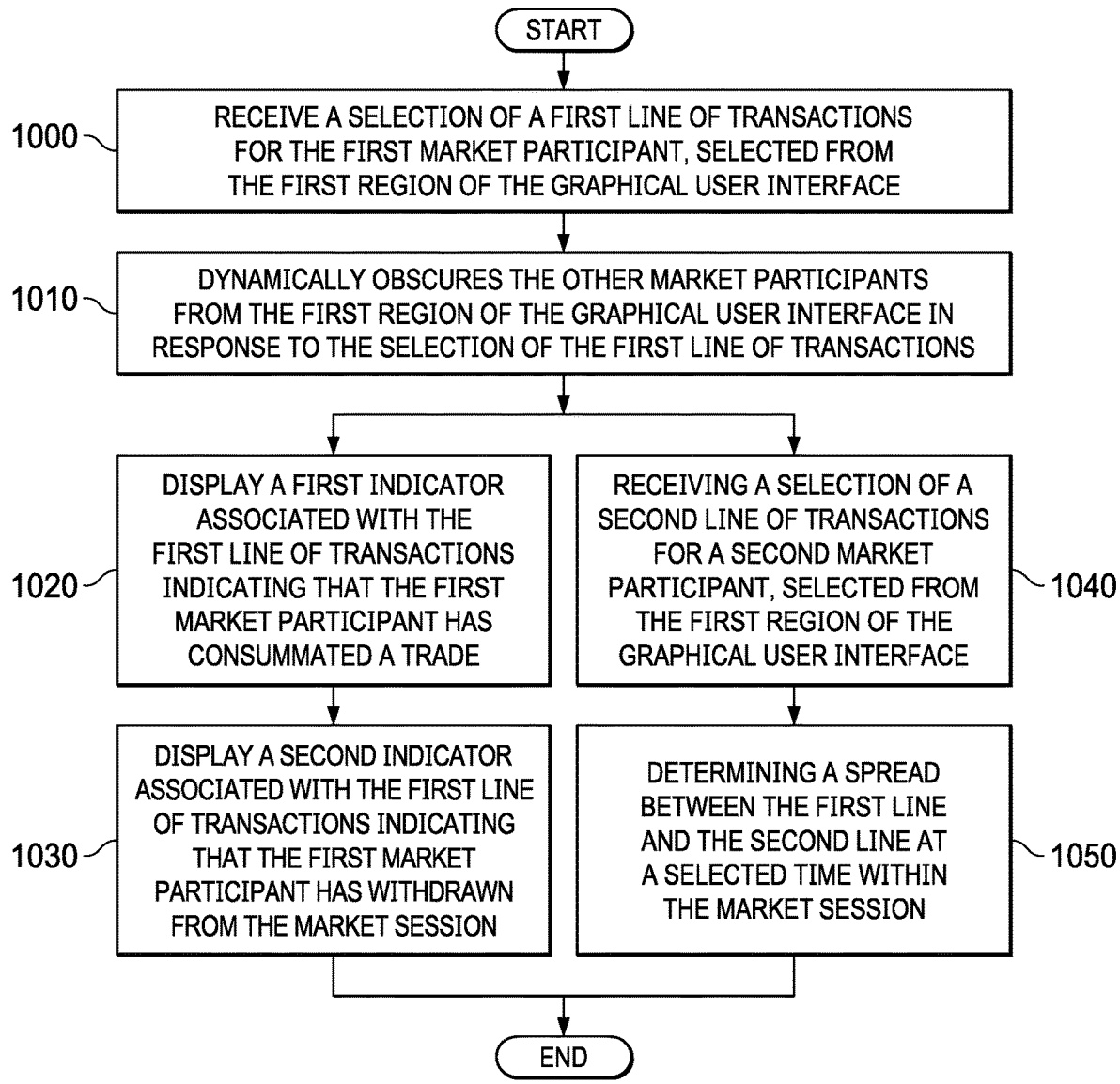
FIG. 10 is a flowchart illustrating a process for displaying market transactions for selected market participants in accordance with an illustrative embodiment.

FIG. 10 is a flowchart illustrating a process for displaying market transactions for selected market participants in accordance with an illustrative embodiment. The process of FIG. 10 can be implemented in conjunction with the graphical user interface displayed in the process of FIG. 8.

The process receives a selection of a first line of transactions for the first market participant, selected from the first region of the graphical user interface (step 1000).

In one embodiment, the process of FIG. 10 dynamically obscures the other market participants from the first region of the graphical user interface in response to the selection of the first line of transactions (step 1010).

In one illustrative embodiment, the process of FIG. 10 displaying a first indicator associated with the first line of transactions indicating that the first market participant has consummated a trade (step 1020).

In one illustrative embodiment, the process of FIG. 10 displays a second indicator associated with the first line of transactions indicating that the first market participant has withdrawn from the market session (step 1030).

In one illustrative embodiment, the process of FIG. 10 includes receiving a selection of a second line of transactions for a second market participant, selected from the first region of the graphical user interface (step 1040). The process dynamically determining a spread between the first line and the second line at a selected time within the market session (step 1050). The process terminates thereafter.

Figure 11:
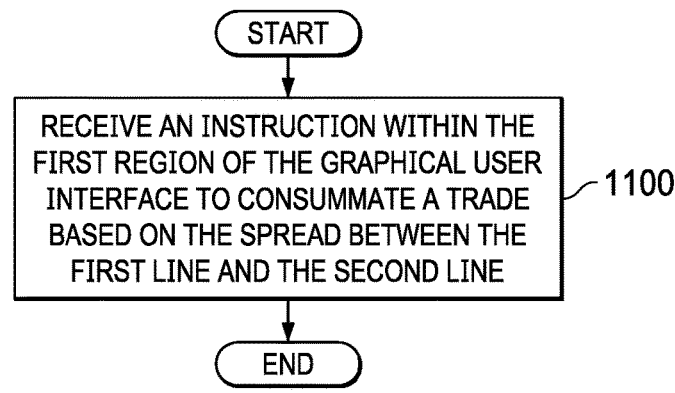
FIG. 11 is a flowchart illustrating a process for submitting an order in accordance with an illustrative embodiment.

Referring now to FIG. 11 is a flowchart illustrating a process for submitting an order in accordance with an illustrative embodiment. The process of FIG. 11 can be implemented in conjunction with the graphical user interface displayed in the process of FIG. 8.

The process receives an instruction within the first region of the graphical user interface to consummate a trade based on the spread between the first line in the second line (step 1100). The process terminates thereafter.

Figure 12:
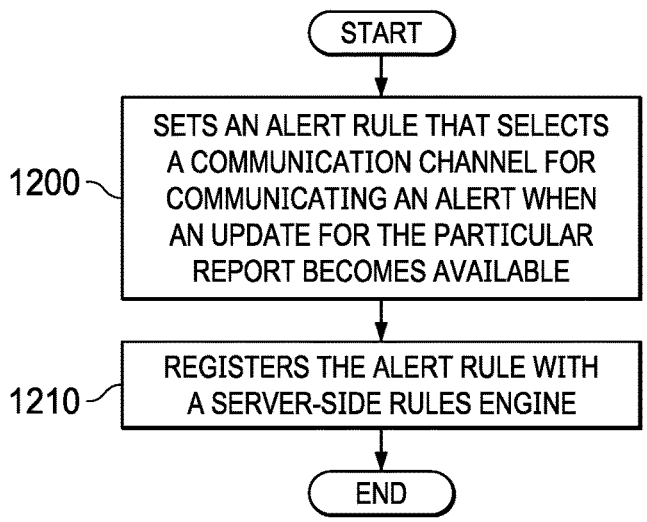
FIG. 12 is a flowchart illustrating a process for subscribing to a market report in accordance with an illustrative embodiment.

FIG. 12 is a flowchart illustrating a process for subscribing to a market report in accordance with an illustrative embodiment. The process of FIG. 12 can be implemented in conjunction with graphical user interface displayed in the process of FIG. 8.

The process sets an alert rule that selects a communication channel for communicating an alert when an update for the particular report becomes available (step 1200). The process registers the alert rule with a server-side rules engine (step 1210), and terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
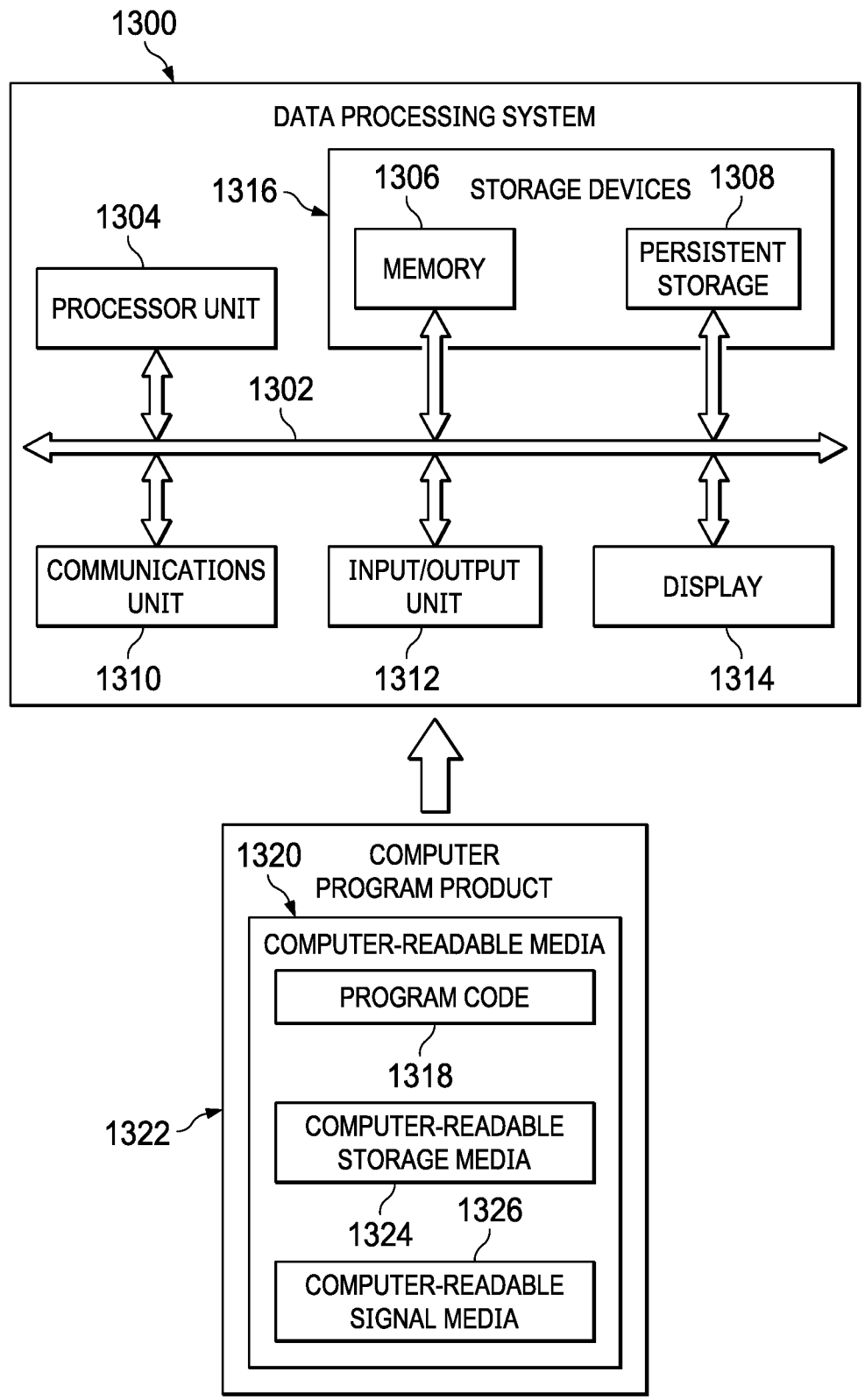
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, and client devices 110 in FIG. 1. Data processing system 1300 can also be used to implement computer system 206 of FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318. The term "non-transitory" or "tangible", as used herein, is a limitation of the medium itself (i.e., tangible, not a signal) as opposed to a limitation on data storage persistency (e.g., RAM vs. ROM). Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In these illustrative examples, computer-readable storage media 1324 is a physical or tangible storage device used to store program code 1318 rather than a medium that propagates or transmits program code 1318. The term "non-transitory" or "tangible", as used herein, is a limitation of the medium itself (i.e., tangible, not a signal) as opposed to a limitation on data storage persistency (e.g., RAM vs. ROM).

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1318 can be located in computer-readable media 1320 in the form of a single storage device or system. In another example, program code 1318 can be located in computer-readable media 1320 that is distributed in multiple data processing systems. In other words, some instructions in program code 1318 can be located in one data processing system while other instructions in program code 1318 can be located in one data processing system. For example, a portion of program code 1318 can be located in computer-readable media 1320 in a server computer while another portion of program code 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, illustrative embodiments of the present invention provide a computer implemented method, computer system, and computer program product for displaying market transactions in a graphical user interface. A market transaction system identifies selected market from a list of subscribed markets displayed in a first region of the graphical user interface. The market transaction system identifies a market session for the selected market. The market transaction system dynamically displaying transactions in the first region of the graphical user interface. The transactions are for market participants in the selected market over the market session. The transactions submitted by a first market participant are separately displayed from the transactions submitted by other market participants as distinct lines of best offers and bids by the first market participant as a function of time within the market session. The market transaction system displays a number of reports that are relevant to the selected market in a second region of the graphical user interface. The market transaction system subscribes to a particular report in response to receiving a selection of the particular report from the second region of the graphical user interface.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying market transactions on a graphical user interface, the method comprising:
    identifying a selected market from a list of subscribed markets displayed in a first region of the graphical user interface;
    identifying a market session for the selected market;
    dynamically displaying transactions in the first region of the graphical user interface, wherein the transactions are for market participants in the selected market over the market session, wherein the transactions submitted by a first market participant are separately displayed from the transactions submitted by other market participants as distinct lines of best offers and bids by the first market participant as a function of time within the market session within a specific time range during the market session;
    displaying a number of reports that are relevant to the selected market in a second region of the graphical user interface;
    subscribing to a particular report in response to receiving a selection of the particular report from the second region of the graphical user interface;
    receiving a selection of a first line of the distinct lines for a first market participant and a second line of the distinct lines for a second market participant, selected from the first region of the graphical user interface; and
    in response to receiving the selections of the first and second lines of the distinct lines, dynamically determining and display a spread between the first line and the second line at a selected time within the market session to compare transactions of the first market participant and the second market participant.

2. The method of claim 1, further comprising:
    displaying a dynamic time scrubber for the market session in the first region of the graphical user interface;
    receiving a selection of a specific time range displayed on the dynamic time scrubber; and in response to the selection of the specific time range, dynamically updating the first region to display a subset of the market participants that are active within the specific time range.

3. The method of claim 1, further comprising:
dynamically obscuring the other market participants from the first region of the graphical user interface in response to the selection of the first line of transactions.

4. The method of claim 1, further comprising:
displaying a first indicator associated with the first line of transactions indicating that the first market participant has consummated a trade.

5. The method of claim 4, further comprising:
displaying a second indicator associated with the first line of transactions indicating that the first market participant has withdrawn from the market session.

6. The method of claim 1, further comprising:
receiving an instruction within the first region of the graphical user interface to consummate a trade based on a spread between the first line and the second line at the selected time.

7. The method of claim 1, further comprising:
setting an alert rule that selects a communication channel for communicating an alert when an update for the particular report becomes available.

8. The method of claim 7, further comprising:
registering the alert rule with a server-side rules engine.

9. A computer system comprising:
a hardware processor;
a display system having a graphical user interface displayed thereon; and
a market transaction system, in communication with the hardware processor and the display system, for displaying market transactions on a graphical user interface, wherein the market transaction system is configured:
to identify a selected market from a list of subscribed markets displayed in a first region of the graphical user interface;
to identify a market session for the selected market;
to dynamically display transactions in the first region of the graphical user interface, wherein the transactions are for market participants in the selected market over the market session, wherein the transactions submitted by a first market participant are separately displayed from the transactions submitted by other market participants as distinct lines of best offers and bids by the first market participant as a function of time within the market session within a specific time range during the market session;
to display a number of reports that are relevant to the selected market in a second region of the graphical user interface;
to subscribe to a particular report in response to receiving a selection of the particular report from the second region of the graphical user interface;
to receive a selection of a first line of the distinct lines for a first market participant and a second line of the distinct lines for a second market participant, selected from the first region of the graphical user interface; and
to in response to receiving the selections of the first and second lines of the distinct lines, dynamically determining and display a spread between the first line and the second line at a selected time within the market session to compare transactions of the first market participant and the second market participant.

10. The computer system of claim 9, wherein the market transaction system is further configured:
to display a dynamic time scrubber for the market session in the first region of the graphical user interface;
to receive a selection of a specific time range displayed on the dynamic time scrubber; and
to update dynamically the first region to display a subset of the market participants that are active within the specific time range in response to the selection of the specific time range.

11. The computer system of claim 9, wherein the market transaction system is further configured:
to obscure dynamically the other market participants from the first region of the graphical user interface in response to the selection of the first line of transactions.

12. The computer system of claim 9, wherein the market transaction system is further configured:
to display a first indicator associated with the first line of transactions indicating that the first market participant has consummated a trade.

13. The computer system of claim 12, wherein the market transaction system is further configured:
to display a second indicator associated with the first line of transactions indicating that the first market participant has withdrawn from the market session.

14. The computer system of claim 9, wherein the market transaction system is further configured:
to receive an instruction within the first region of the graphical user interface to consummate a trade based on a spread between the first line and the second line at the selected time.

15. The computer system of claim 9, wherein the market transaction system is further configured:
to set an alert rule that selects a communication channel for communicating an alert when an update for the particular report becomes available.

16. The computer system of claim 15, wherein the market transaction system is further configured:
registering the alert rule with a server-side rules engine.

17. A computer program product comprising:
a computer readable storage media; and
program code, stored on the computer readable storage media, for displaying market transactions on a graphical user interface, the program code comprising:
program code for identifying a selected market from a list of subscribed markets displayed in a first region of the graphical user interface;
program code for identifying a market session for the selected market;
program code for dynamically displaying transactions in the first region of the graphical user interface, wherein the transactions are for market participants in the selected market over the market session, wherein the transactions submitted by a first market participant are separately displayed from the transactions submitted by other market participants as distinct lines of best offers and bids by the first market participant as a function of time within the market session within a specific time range during the market session;
program code for displaying a number of reports that are relevant to the selected market in a second region of the graphical user interface;
program code for subscribing to a particular report in response to receiving a selection of the particular report from the second region of the graphical user interface program code for receiving a selection of a first line of the distinct lines for a first market participant and a second line of the distinct lines for a second market participant, selected from the first region of the graphical user interface; and program code for in response to receiving the selections of the first and second lines of the distinct lines, dynamically determining and display a spread between the first line and the second line at a selected time within the market session to compare transactions of the first market participant and the second market participant.

18. The computer program product of claim 17, wherein the program code stored on the computer readable storage media further comprises:

program code for displaying a dynamic time scrubber for the market session in the first region of the graphical user interface;

program code for receiving a selection of a specific time range displayed on the dynamic time scrubber; and program code for dynamically updating the first region to display a subset of the market participants that are active within the specific time range in response to the selection of the specific time range.

19. The computer program product of claim 17, wherein the program code stored on the computer readable storage media further comprises:

program code for dynamically obscuring the other market participants from the first region of the graphical user interface in response to the selection of the first line of transactions.

20. The computer program product of claim 17, wherein the program code stored on the computer readable storage media further comprises:

program code for displaying a first indicator associated with the first line of transactions indicating that the first market participant has consummated a trade.

21. The computer program product of claim 20, wherein the program code stored on the computer readable storage media further comprises:

program code for displaying a second indicator associated with the first line of transactions indicating that the first market participant has withdrawn from the market session.

22. The computer program product of claim 17, wherein the program code stored on the computer readable storage media further comprises:

program code for receiving an instruction within the first region of the graphical user interface to consummate a trade based on a spread between the first line and the second line at a selected time.

23. The computer program product of claim 17, wherein the program code stored on the computer readable storage media further comprises:

program code for setting an alert rule that selects a communication channel for communicating an alert when an update for the particular report becomes available.

24. The computer program product of claim 17, wherein the program code stored on the computer readable storage media further comprises:

program code for registering a alert rule with a server-side rules engine.

* * * * *